(12) United States Patent
Stevenson

(10) Patent No.: US 7,219,783 B2
(45) Date of Patent: May 22, 2007

(54) APPARATUS AND METHOD FOR MEASURING THE SPEED OF A BURIED TRANSMISSION COMPONENT

(75) Inventor: Paul D. Stevenson, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 216 days.

(21) Appl. No.: 11/110,367

(22) Filed: Apr. 20, 2005

(65) Prior Publication Data
US 2006/0240944 A1   Oct. 26, 2006

(51) Int. Cl.
*F16D 43/28* (2006.01)
(52) U.S. Cl. .................................. 192/103 C
(58) Field of Classification Search ............ 192/103 F, 192/103 C; 477/175, 176
See application file for complete search history.

(56) References Cited

U.S. PATENT DOCUMENTS 5,788,040 A * 8/1998 Moorman et al. ...... 192/103 C

* cited by examiner

*Primary Examiner*—Dirk Wright
(74) *Attorney, Agent, or Firm*—Christopher DeVries

(57) ABSTRACT

The present invention relates to the use of a magnetic sensor to detect the speed of transmission clutch plates or clutch hub. A clutch fiber plate, which is mechanically linked to a buried (or inwardly nested) transmission component, is serrated to generate detectable pulsations or fluctuations in the magnetic intensity of the clutch fiber plate as it rotates. The speed of the buried transmission component is useful in controlling a second clutch arrangement to reduce engine torsional pulses by generating a predetermined amount of slip upon engagement. Moreover, the sensor is configurable to determine the acceleration of the clutch fiber plate to control engine acceleration during a vehicle launch. The sensor is mounted to the transmission housing radially superjacent the clutch fiber plate; therefore, the axial space claim for the transmission does need not increase to accommodate the sensor.

14 Claims, 2 Drawing Sheets

APPARATUS AND METHOD FOR MEASURING THE SPEED OF A BURIED TRANSMISSION COMPONENT

TECHNICAL FIELD

The present invention relates to a speed detecting arrangement for a vehicle transmission capable of measuring the speed of inwardly nested transmission components without adding axial length to the transmission.

BACKGROUND OF THE INVENTION

Speed sensors can be implemented into vehicle transmissions to measure the relative speed of rotatable transmission components. Contemporary sensor options include laser sensors responsive to fluctuations in reflective light and those responsive to magnetic flux. Since most transmissions use non-transparent lubricants like oil between moving components, sensors detecting magnetic flux are generally preferred over laser sensors. The detected change in magnetic intensity ($\Delta H$) due to the presence of a transmission component is dependent upon its distance away from the sensor.

The measured speed of certain transmission components can be used to govern clutch timing to improve on the accuracy of shift point and shift feel and to control the speed of a continuously slipping system such as a torque converter clutch. However, these sensors can add axial length to the transmission when used to measure the speed of a buried or inwardly nested transmission component.

SUMMARY OF THE INVENTION

The present invention enables the measurement of the speed of buried or inwardly nested transmission components without adding to the axial spacing requirements of the transmission. Such information can be used to govern clutch engagement and controlled slip in a manner to cancel or reduce the effects of engine torsional pulses.

More specifically, the present invention includes a transmission having a clutch assembly with a clutch housing grounded to a transmission housing. The clutch assembly further includes a clutch hub rotatable with respect to the transmission housing and more radially inwardly nested in the transmission with respect to the clutch housing. Additionally a speed sensor, which is responsive to magnetic fields, is mounted with respect to the clutch housing. Lastly, a clutch fiber plate is mounted to the clutch hub for rotation therewith; the clutch fiber plate has a steel core and a heterogeneous outer diameter on the steel core to enable the clutch fiber plate to generate magnetic flux pulsations for speed sensing.

A method of variably dampening engine torsional pulses according to the speed of certain predetermined transmission components is also included with the present invention. The method includes: monitoring the speed of an outer transmission component which is mechanically linked to an inner transmission component; and hydraulically actuating a clutch in response to the speed of the outer transmission component in a manner to produce a predetermined amount of slip. This slip is configurable to eliminate or reduce the transmission of the engine generated torsional pulses.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
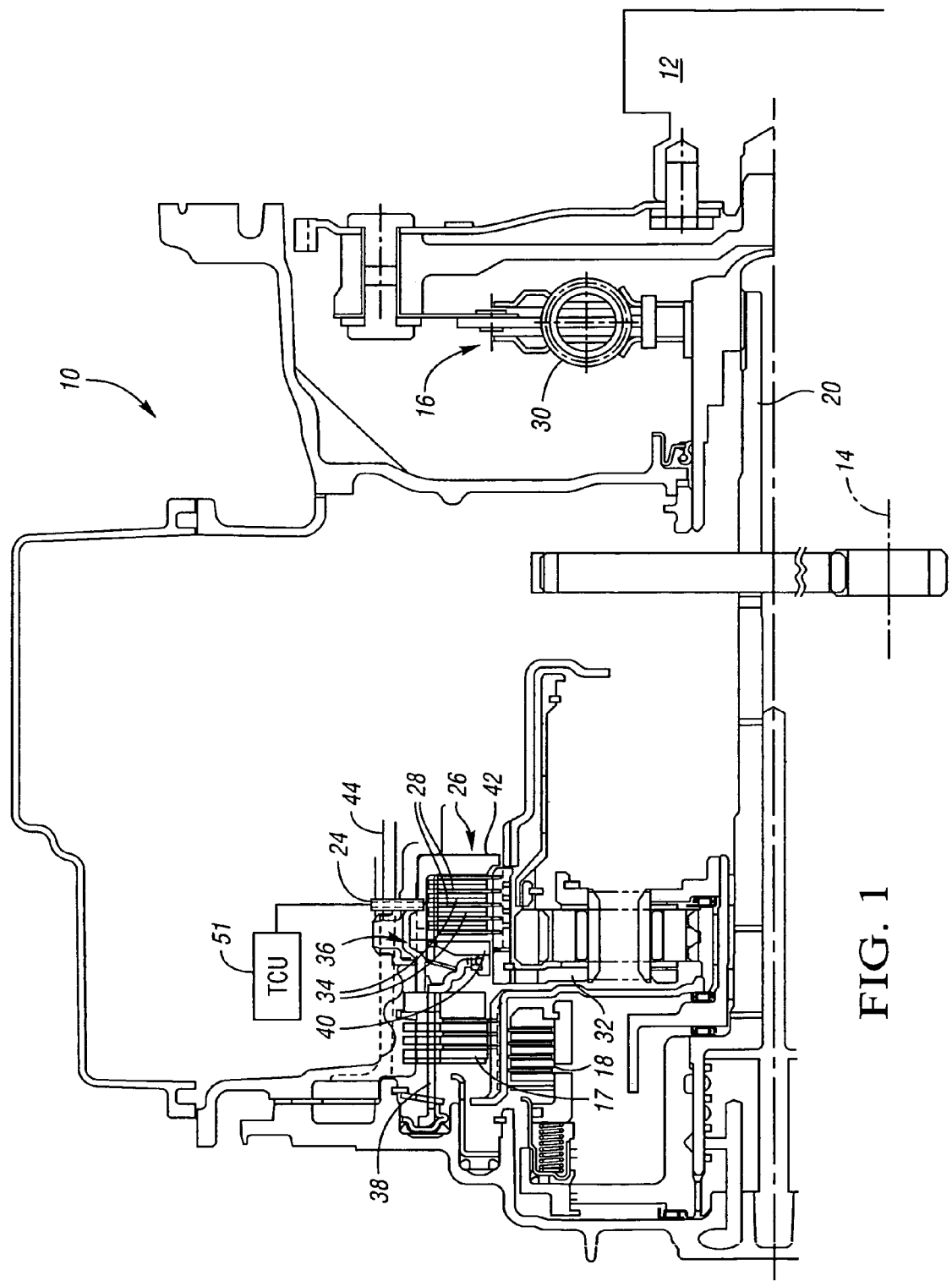
FIG. 1 is a schematic side view of the top half of a transmission shown in fragmentary view having a speed sensor and an adjacent clutch assembly.
Figure 2:
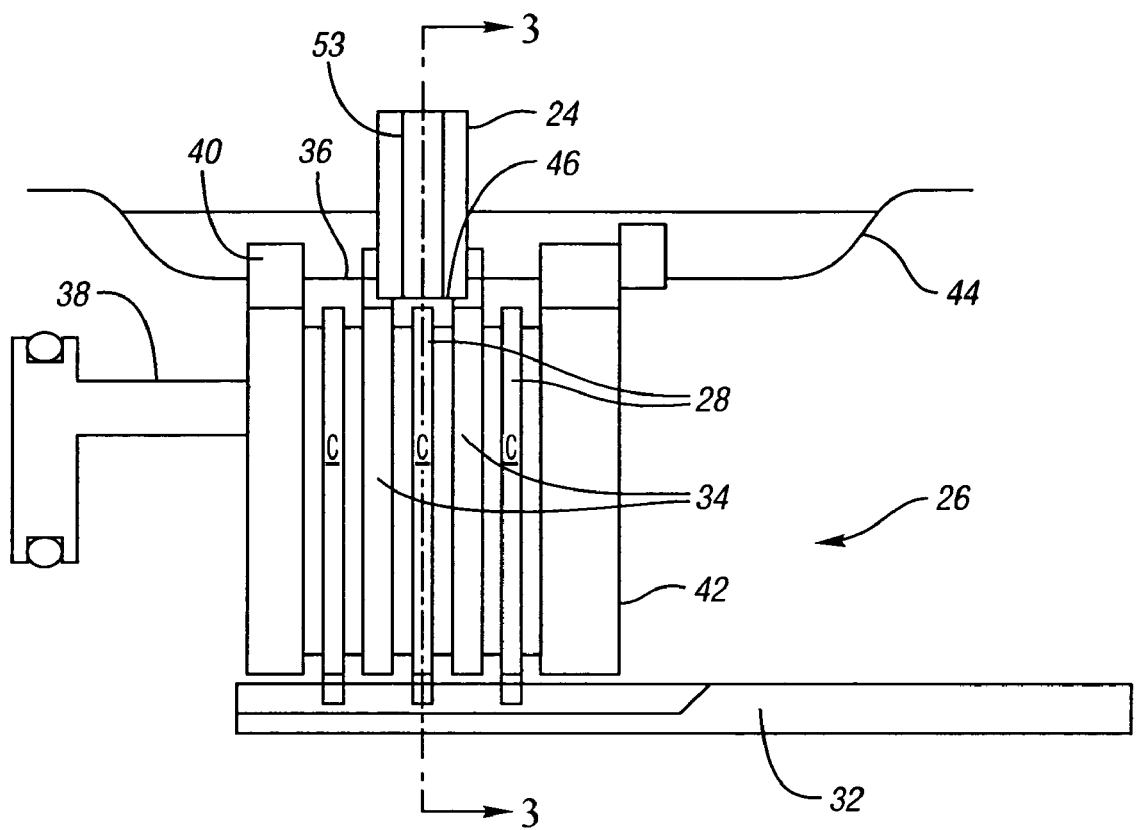
FIG. 2 is a schematic side view of a speed sensor and clutch assembly.
Figure 3:
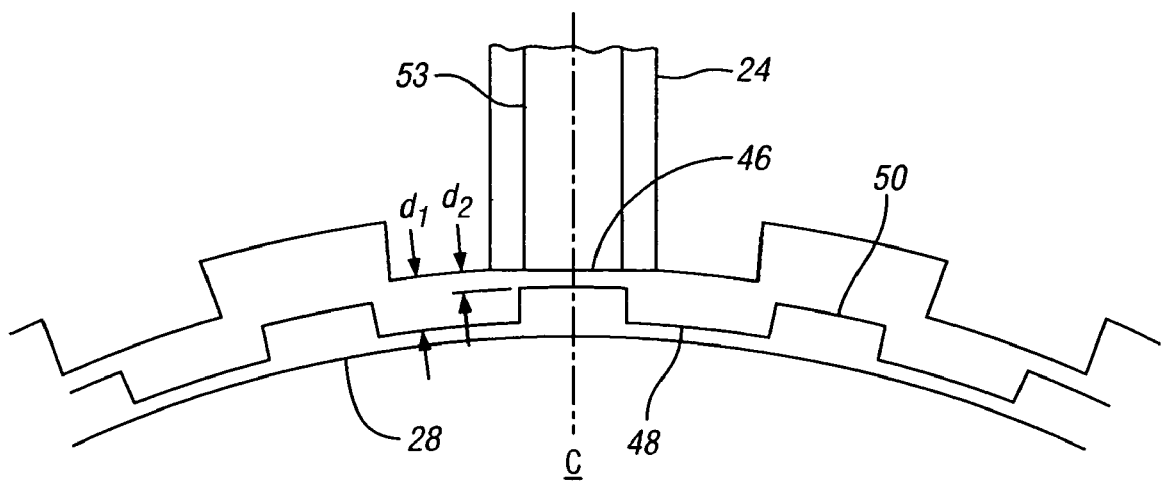
FIG. 3 is a schematic illustration of the speed sensor and clutch plates in fragmentary cross-sectional view taken along line 3—3 of FIG. 2.

Referring to the drawings, FIGS. 1 through 3, wherein like characters represent the same or corresponding parts throughout the several views there is shown in FIG. 1 a side view of a vehicle transmission 10. Fundamentally, the present invention includes a transmission 10 with a clutch assembly 26. The clutch assembly 26 includes a clutch housing 36 grounded to a transmission housing 44 and a clutch hub 32 rotatable with respect to the transmission housing 44 and more inwardly nested in the transmission with respect to the clutch housing 36. Further included is a speed sensor 24 responsive to magnetic fields and mounted with respect to the clutch housing 36. Also included is a clutch fiber plate 28 rotatable with the clutch hub 32. The clutch fiber plate 28 has a heterogeneous outer diameter to enable the clutch fiber plate to generated recognizable magnetic flux pulsations for speed sensing.

More specifically, FIG. 1 displays selected components of a vehicle transmission 10 driven by an engine 12 (as schematically shown). The engine 12 is capable of producing torsional pulses during operation. These pulses may transmit to the vehicle operator if not canceled or absorbed before reaching the vehicle driveline 14. The magnitude of the torsional pulses produced by the engine 12 varies according to the size and speed of the engine. For example, an eight-cylinder engine will produce torsional pulses that are distinct from those produced by a four- or six-cylinder engine. Moreover, torsional pulses generated during engine start or stop are generally of higher magnitude than torsional pulses generated when the engine is operating at higher speeds.

In addition to utilizing the torsional damper assembly 16 to reduce the transmission of torsional pulses generated by the engine 12, clutch assemblies (such as 17 or 18 of FIG. 1) can be configured to slip upon engagement to effectively reduce transmission of residual engine torsional pulses. For example, to cancel out a residual torsional pulse of ±20 rpm a predetermined slippage equivalent to more than 20 rpm on the input shaft 20 must be produced by clutch assembly 18. Or to cancel a residual torsional pulse of ±30 rpm, a slippage equivalent to more than 30 rpm on the input shaft 20 must be produced by clutch assembly 18 or any other clutch. The residual torsional pulse is a function of the engine speed, the assembly inertia of the damper, and the dampening characteristics of the torsional damper assembly 16. The dampening characteristics of the torsional damper assembly 16 are determinable from the damper assembly's inertia, spring rate, and frictional characteristics. The actual speed of the engine 12 may be determined by measuring the speed of the input shaft 20 of the transmission 10 or by measuring the speed of a transmission component that is directly linked to the input shaft. However, transmission components that are directly linked to the input shaft 20 of the transmission 10 are generally nested inward with respect to the case of the transmission 10 making it difficult to implement a sensing system to detect the annular speed of such components without increasing the axial space claim for the entire transmission 10. Typically, to monitor the speed of an inwardly nested transmission component a rotating part is brought around the clutch assembly 26 to the transmission housing 44 (or ground) where a conventional speed sensor could be mounted; or the non-rotating speed sensor could be brought inward between other non-rotating parts. Either of these arrangements, significantly increases the axial space required for the transmission 10.

One technical advantage of the present invention is that the speed sensor 24 is mounted superjacent a clutch assembly 26, as shown in FIG. 1. The clutch assembly 26 includes a rotatable clutch fiber plate 28 which is linked to a buried or inwardly nesting transmission component that is indirectly linked to the input shaft 20 of the transmission 10 when the clutch assembly 26 is not engaged. Under such circumstances, the clutch fiber plate 28 rotates relative to a given inwardly nested transmission component at a known rate, provided there is no other clutch slip. Where there is slip, knowing the speed of plate 28 and the input shaft 20 can also enable the calculation of the slip in another controlled slip clutch.

In FIG. 1, the input shaft 20 is directly linked to the engine 12 through the torsional damper assembly 16. The torsional damper assembly 16 is equipped with annular springs 30 to absorb engine torsional pulses. Indirectly linked to the input shaft 20 is a clutch (or planetary) hub 32—an inwardly nested transmission component. The hub 32 and clutch fiber plates 28 fixed thereto rotate at a predetermined speed ratio in each gear ratio with respect to the main shaft 22 when the clutch assembly 26 is disengaged. The clutch assembly 26 also includes the clutch plates 34 that are secured to a non-rotatable clutch housing (or case) 36. The clutch fiber plate 28 and clutch plate 34 are engaged by a piston 38 that selectively moves the apply plate 40 of the clutch assembly 26. The clutch plates 28 and 34 are secured into place by the backing plate 42. The clutch fiber plate 28 is made of a friction material attached to a metallic material core, preferably a ferrous material like steel.

The speed sensor 24, as shown in FIG. 1, is mounted within the transmission housing 44. The eye of the sensor 46, as shown in FIGS. 2 and 3, is configured to rest relatively flush with respect to the clutch housing 36. This enables the sensor 24 to be closer to the steel core (C) of the clutch fiber plate 28, as shown in FIG. 2. The proximity of the sensor 24 relative to the steel core (C) of the clutch fiber plate 28 enables a more focused or concentrated sensing range for the reading of the annular speed of the clutch fiber plate 28. In the pictured embodiment, the sensor 24 produces a magnetic field and is responsive to changes in that magnetic field due to the presence of objects within its sensing range. As the distance between the clutch fiber plate 28 and the speed sensor 24 increases the magnetic intensity decreases and vise versa. The clutch fiber plate 28 is therefore designed with a heterogeneous outer surface (or varying periphery) to generate detectable fluctuations or pulsations in the generated magnetic field. As shown in FIG. 3, the clutch fiber plate 28 is configured with teeth having an inner and outer diameter, 48 and 50 respectively. The inner diameter of the clutch fiber plate 28 is located a distance, $d_1$, away from the eye 46 of the sensor 24 and the outer diameter is located a distance, $d_2$, away from the eye 46 of the sensor 24. Since the outer diameter 50 of the steel core (C) of the clutch fiber plate 28 is closer to the eye 46 of the sensor 24 the magnetic field of the speed sensor due to the inner diameter 48 of the clutch fiber plate is less than the magnetic field due to the outer diameter 50 of the clutch fiber plate. The speed sensor 24 recognizes this change in the magnetic field or intensity as the clutch fiber plate 28 rotates with respect to the transmission thereby generating pulsations in the sensed magnetic intensity. The sensor 24 relays this information to the transmission control unit 51, as shown in FIG. 1, which accordingly controls the slippage of clutch assemblies such as 17 and 18.

The steel core (C) of the clutch fiber plate 28 may also move axially; however, the clutch fiber plate 28 is constrained with the clutch assembly 26 by the axial span of the apply and backing plates (40 and 42 respectively) of the clutch assembly so that it does not move beyond the detecting range of the speed sensor 24 as defined by channel 53 of the speed sensor as shown in FIGS. 2 and 3. The clutch fiber plate 28 is 0.7 mm thick in the preferred embodiment. Overall, this arrangement enables the reading of the speed of an inwardly nested transmission component without increasing the axial space claim of the transmission. Alternatively, the transmission control unit 51 can be configured to command secondary clutches such as 18 and 17 to slip according to the engine speed, not measuring the actual speed of an inwardly nested transmission component thus accepting a compromise in the control system; or a rotating part could be brought around the clutch assembly 26 to the transmission housing 44 (or ground) where a conventional speed sensor could be mounted, thereby increasing the axial space claim for the transmission. Conversely, a gap could be created to bring the speed sensor between stationary parts to a rotating part. Each of the alternatives would increase the axial length of the transmission.

Another technical advantage of the present invention is that the acceleration of the clutch fiber plate 28 can be determined from the sensed speed of the clutch hub 32. The acceleration of the clutch fiber plate 28 is indicative of the torque produced by accelerating the engine and transmission components. A control unit such as 51 shown in FIG. 1 can be used to increase or decrease the acceleration of the engine during a shift of transmissions ratios by controlling a clutch's capacity (26, 17 or 18). The controlled acceleration governs the inertia torque and thus the feel of the shift.

The present invention also provides a method of monitoring the speed of a buried or inwardly nested transmission component to produce an electrical signal that can be used to control clutches to effectively reduce or cancel out the torsional pulses generated by the engine. The method includes: monitoring the speed of an outer transmission component (28 in the embodiment shown in FIG. 1) which is mechanically linked to an inner transmission component 32; and hydraulically actuating a clutch 17 or 18 in response to the speed of the outer transmission component 28 in a manner to produce a predetermined amount of slip. This slip is configurable to eliminate or reduce engine generated torsional pulses. The monitoring of the speed of the outer transmission component is conducted by a speed sensor responsive to the change in magnetic intensity or field resulting from the presence of an outer transmission component; and the outer transmission component has a heterogeneous outer diameter for generating pulsations in the magnetic intensity.

While the best mode for carrying out the invention has been described in detail, those familiar with the art to which this invention relates will recognize various alternative designs and embodiments for practicing the invention within the scope of the appended claims.

The invention claimed is:

1. A transmission having a clutch assembly, comprising:
   a clutch housing with non-rotatable plates mounted with respect to a transmission ground;
   a clutch hub rotatable with respect to said transmission ground and more radially inwardly nested in the transmission with respect to said clutch housing;
   a speed sensor responsive to magnetic fields and mounted with respect to said clutch housing; and
   a clutch fiber plate splined to said clutch hub for rotation therewith; said clutch fiber plate having a steel core and a heterogeneous outer diameter on said steel core to enable said clutch fiber plate to generate magnetic field pulsations for speed sensing.

2. The transmission of claim 1, wherein said clutch case is a transmission case.

3. The transmission of claim 1, further comprising:
   a control unit operative to control a second clutch assembly; said second clutch assembly configurable to slip to selectively cancel or reduce residual torsional pulses transmitted to a vehicle driveline according to the speed sensed by said speed sensor.

4. The transmission of claim 2, further comprising:
   a control unit communicable with said speed sensor;
   wherein said speed sensor is configurable to determine the acceleration of said clutch fiber plate; and
   wherein said control unit further controls the torque capacity of one of said clutch assembly and a second clutch assembly so as to control the acceleration of a vehicle engine in response to the determined acceleration of said clutch fiber plate.

5. The transmission of claim 1, wherein said speed sensor is mounted radially superjacent said clutch fiber plate so as to not require additional axial spacing; wherein said speed sensor may sense the speed of rotation of said clutch fiber plate irrespective of the axial movement of said clutch fiber plate.

6. The transmission of claim 1, wherein said clutch fiber plate has teeth to enable said clutch fiber plate to generate magnetic field pulsations for speed sensing.

7. A powertrain having a transmission with a predetermined allowable length, comprising:
   an internal combustion engine characterized as generating torsional pulses;
   a rotatable clutch fiber plate in a transmission clutch assembly of predetermined outer diameter, axially moveable for clutching the transmission; said clutch fiber plate having teeth on an outer diameter thereof; and
   a speed sensor insertable radially adjacent said clutch fiber plate sufficiently toward the teeth to sense the speed of rotation of said clutch fiber plate irrespective of the axial movement of said clutch fiber plate without increasing the predetermined axial length of the transmission.

8. The powertrain of claim 7, further comprising:
   a second clutch assembly configurable to reduce the transmission of residual torsional pulses to a vehicle driveline.

9. The transmission of claim 8, further comprising:
   a control unit communicable with said speed sensor;
   wherein said speed sensor is configurable to determine the acceleration of said clutch fiber plate; and
   wherein said control unit further controls the torque capacity of one of said transmission clutch assembly and a second clutch assembly to control the acceleration of said engine to a desired magnitude in response to the determined acceleration of said clutch fiber plate.

10. The powertrain of claim 9, wherein the teeth are sufficiently sized to generate a magnetic intensity significantly greater than a core magnetic intensity generated by said clutch fiber plate absent the teeth.

11. A method of controlling a transmission clutch assembly according to the speed of predetermined inwardly nested transmission components:
    monitoring the speed of an outer transmission component; wherein said outer transmission component is mechanically linked to an inner transmission component;
    wherein said monitoring of the speed of an outer transmission component is conducted by a speed sensor responsive to the magnetic intensity generated by said outer transmission component; and
    wherein said outer transmission component has a heterogeneous outer diameter for generating pulsations in said magnetic intensity.

12. The method of claim 11, wherein said speed sensor is mounted superjacent said clutch fiber plate with an axial length determined by said outer transmission component so as to not require additional axial spacing; and wherein said speed sensor may sense the speed of rotation of said outer transmission component irrespective of the axial movement of said outer transmission component.

13. The method of clam 12, further comprising:
    hydraulically actuating a clutch in response to the monitored speed of said outer transmission component in a manner to produce a predetermined amount of slip;
    wherein said slip is configurable to eliminate or reduce the transmission of the engine torsional pulses to a vehicle driveline.

14. The method of claim 12, further comprising:
    determining the acceleration of said clutch fiber plate; and
    controlling the acceleration of a vehicle engine in response to the determined acceleration of said clutch fiber plate.

* * * * *